3,248,376
VINYL POLYMERIZATION IN THE PRESENCE OF PHOSPHINE COMPOUNDS AS OXYGEN REMOVERS

Aubrey D. Jenkins, Maidenhead, and Leszek J. Wolfram, Caversham, England, assignors to The Gillette Company, Boston, Mass., a corporation of Delaware
No Drawing. Filed Dec. 27, 1962, Ser. No. 247,556
2 Claims. (Cl. 260—88.7)

This invention relates to a method of carrying out oxygen-affected chemical reactions.

For the sake of simplicity of technique, chemical reactions are usually carried out in the presence of air and, as a consequence, undesirable side-reactions sometimes occur owing to the reactivity of the oxygen present, oxygen constituting approximately 21% of the atmosphere. Oxidation may simply lead to wastage of starting materials by partial conversion to unwanted products but frequently its effects are more series; it often results in discoloration and in certain cases, the presence of oxygen greatly reduces the rate of reaction sometimes even to the extent of virtually stopping the process for an "induction period" during which the oxygen present is being consumed; all such reactions which are deleteriously affected in one way or another by the presence of oxygen are referred to herein as "oxygen-affected reaction."

In the last case mentioned above, where inhibition by oxygen occurs, steps are usually taken to remove the atmospheric oxygen before reaction commences. This may be achieved by pumping the system down to allow pressure, but on the commercial scale the more common practice is to displace the air with an inert gas, such as nitrogen or carbon dioxide. This is rarely entirely successful although it does result in a considerable shortening of the induction period. The residual induction period is not highly reproducible and, moreover, since the material produced during this time will have different properties from that obtained in the main period of reaction, there may be difficulty in obtaining a uniform product.

Among the reactions which are most strongly influenced adversely by oxygen are the so-called "radical chain reactions" where oxygen may "break" the chain by reaction with a "chain-carrier." One of the most important examples of this class of reaction is vinyl polymerization, the process by which polymers of styrene, vinyl acetate, methyl methacrylate, acrylonitrile and many other monomers are produced.

We have found that phosphine derivatives of the formula

and their salts of the formula

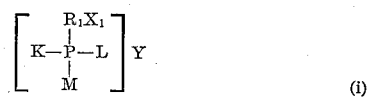

where K is hydrogen or a substituent $-R_2X_2$, L is hydrogen or a substituent $-R_3X_3$, M is hydrogen or a substituent $-R_4X_4$, $R_1$, $R_2$, $R_3$, and $R_4$ are alklene groups which may be the same or different, $X_1$, $X_2$, $X_3$, and $X_4$ are polar substituents, and Y is an anion, react very rapidly with oxygen in solution and are very effective oxygen scavengers. The present invention comprises a method of carrying out an oxygen-affected reaction in which the reaction mixture contains a low concentration of a compound of Formula I or II above.

The invention is preferably applied to reactions, more particularly vinyl polymerization reactions, carried out in polar solvents, such as water and N,N-dimethylformamide, and it is further preferred that the oxygen-scavenging compound should be soluble in the reaction medium. For this reason it is preferred that the alkylene groups, $R_1$, $R_2$, $R_3$, and $R_4$, should be of limited size, that is, should contain less than a certain number of carbon atoms, since beyond a certain size of alkylene group, the compounds will no longer be soluble in such preferred solvents despite the solvating action of the X substituents. For use with such solvents, the alkylene groups of the compounds should, in general, not contain more than 5 carbons atoms and preferably not more than 4; advantageously the R groups contain from 1 to 3 carbon atoms. The X groups may be of any of a number of polar groups, preferred groups being hydroxy—OH, amino—$NH_2$ and carbamyl—$CONH_2$.

Of the various mono-, di-, and tri-substituted phosphines falling within formula (I), the tri-substituted compounds in which $R_1X_1$, $R_2X_2$, and $R_3X_3$ are all the same are preferred. A particularly preferred compound is tris(hydroxymethyl) phosphine (THP).

Formula II above includes both acid addition salts of the mono-, di- and tri-substituted phosphines of Formula I (i.e., the salts of Formula II in which M is hydrogen) and tetra-substituted phosphonium salts (i.e., the salts of Formula II in which M is $-R_4X_4$). The anion Y may be organic or inorganic and will, for convenience, be derived from a readily available acid. Chloride and acetate salts are conveniently used. Of the tetra-substituted phosphonium salts, those in which $R_1X_1$, $R_2X_2$, $R_3X_3$, and $R_4X_4$ are all the same are preferred; a particularly preferred salt of this type is tetrakis-(hydroxymethyl) phosphonium chloride (THPC).

The amount of the oxygen-scavenging compound used in the method according to the invention is suitably 1% or less based on the weight of the reaction medium, such as water. Aqueous reaction media in which these compounds are used preferably have a pH of from 1 to 7.

In order that the invention may be more fully understood, the fllowing examples are given by way of illustration only.

Example 1

10 ml. acrylonitrile, 20 ml. water, 26 mg. azo-bis-isobutyronitrile, approximately 50 mg. agar and 80 mg. THPC were mixed together for 30 minutes at room temperature. The reaction vessel was then transferred to a thermostat bath at 60° C. for 1 hour during which time polymerization occurred with the formation of a substantial amount of polymer. This amount was normally approximately 1.5 g., but occasionally up to 5 g. was produced when the polymer tended to adhere to sides of the vessel rendering conditions non-homogeneous through the suspension.

A similar experiment omitting THPC yielded only about 0.1 g. of polymer, and even when nitrogen was used to flush oxygen from the system for a period of 20 minutes, only 0.7 g. polymer was formed.

Example 2

10 ml. methyl methacrylate, 20 ml. water, 10 mg. azo-bis-isobutyronitrile, approximately 50 mg. agar and 80 mg. THPC were mixed together for 30 minutes at room temperature. The reaction vessel was then transferred to a thermostat bath at 60° C. for 1 hour during which time polymerization occurred with the formation of approximately 0.34 g. polymer which was isolated by pouring into methanol.

A similar experiment omitting THPC yielded virtually no polymer.

Example 3

10 ml. vinyl acetate, 20 ml. water, 1.5 mg. azo-bis-isobutyronitrile, 80 mg. agar, and 100 mg. THPC were mixed together for 20 minutes at room temperature. The reaction vessel was then transferred to a thermostat bath at 60° C. for 1 hour during which time approximately 1 g. polymer was produced, which was isolated by pouring into hexane.

A similar experiment omitting THPC yielded virtually no polymer.

*Example 4*

7 ml. acrylonitrile, 93 ml. 50% aqueous potassium thiocyanate solution, 250 mg. azo-bis-isobutyronitrile, and 600 mg. THPC were mixed together for 20 minutes at room temperature. The reaction vessel was then transferred to a thermostat bath at 60° C. for 1 hour during which time polymerization took place with the formation of approximately 4.5 g. polymer which was isolated by pouring into methanol. This polymer was quite white.

A similar experiment omitting THPC gave approximately 1.5 g. polymer having a yellow color.

*Example 5*

10 ml. methyl methacrylate, 20 ml. water, 100 mg. potassium persulphate, approximately 0.2 ml. Sandopan KD400 emulsifier, and 100 mg. THPC were mixed together for 20 minutes at room temperature. The reaction vessel was then transferred to a thermostat bath at 50° C. for 1 hour during which time approximately 2 g. polymer was produced which was isolated by pouring into methanol.

A similar experiment omitting THPC yielded virtually no polymer.

*Example 6*

5 ml. acrylonitrile, 25 ml. N,N-dimethylformamide, and 250 mg. THPC were mixed together and maintained at 60° C. for 90 minutes. At the end of this time 60 mg. azo-bis-isobutyronitrile was added and, after a further 60 minutes, approximately 0.4 g. polymer was formed which was precipitated with methanol.

A similar experiment omitting THPC yielded virtually no polymer.

It is apparent from the foregoing that the use of THPC virtually eliminates the deleterious effect of oxygen in oxygen-affected reactions without recourse to nitrogen flushing or any other procedure for the removal of oxygen.

Although specific embodiments of the invention have been herein described, it is not intended to limit the invention solely thereto but to include all of the obvious variations and modifications within the spirit and scope of the appended claims.

What we claim is:

1. In the method of carrying out a free radical initiated polymerization of a vinyl monomer subject to oxygen inhibition, the step which comprises polymerizing said monomer in the presence of a member of the class consisting of tris (hydroxymethyl) phosphine and tetrakis (hydroxymethyl) phosphonium chloride in an amount up to 1% by weight of said monomer.

2. In the method of carrying out a free radical initiated polymerization of a vinyl monomer subject to oxygen inhibition, the step which comprises polymerizing said monomer in a polar solvent selected from the class consisting of water and N,N-dimethylformamide and in the presence of a member of the class consisting of tris (hydroxymethyl) phosphine and tetrakis (hydroxymethyl) phosphinium chloride in an amount up to 1% by weight of said solvent.

References Cited by the Examiner

UNITED STATES PATENTS

| | | | |
|---|---|---|---|
| 2,768,148 | 10/1956 | Schildknecht et al. | 260—88.7 |
| 2,794,793 | 6/1957 | Coover | 260—88.7 |
| 2,889,303 | 6/1959 | De Witt | 260—30.6 |
| 3,055,861 | 9/1962 | Hersh et al. | 260—45.7 |
| 3,117,112 | 1/1964 | Mirabile et al. | 260—88.7 |

JOSEPH L. SCHOFER, *Primary Examiner.*

DONALD E. CZAJA, *Examiner.*